US009150354B1

(12) United States Patent
Gischel

(10) Patent No.: US 9,150,354 B1
(45) Date of Patent: Oct. 6, 2015

(54) TRASH CAN SYSTEMS

(71) Applicant: Doris Gischel, Baltimore, MD (US)

(72) Inventor: Doris Gischel, Baltimore, MD (US)

( * ) Notice: Subject to any disclaimer, the term of this patent is extended or adjusted under 35 U.S.C. 154(b) by 0 days.

(21) Appl. No.: 14/662,122

(22) Filed: Mar. 18, 2015

Related U.S. Application Data

(60) Provisional application No. 61/969,358, filed on Mar. 24, 2015.

(51) Int. Cl.

*B62B 1/24* (2006.01)
*B65F 1/14* (2006.01)
*B65F 1/16* (2006.01)

(52) U.S. Cl.

CPC ............. *B65F 1/1473* (2013.01); *B65F 1/1638* (2013.01); *B65F 1/1646* (2013.01); *B65F 2001/1676* (2013.01); *B65F 2250/11* (2013.01)

(58) Field of Classification Search

CPC .... B65D 2313/04; B65D 55/02; B65D 43/24; B65D 43/164; B65F 1/1615; B65F 2210/148; B65F 2210/108; B65F 2001/1669; B65F 1/1473; B65F 1/1646; B65F 1/1638; B65F 2001/1676; B65F 2250/11

See application file for complete search history.

(56) References Cited

U.S. PATENT DOCUMENTS

| | | | | |
|---|---|---|---|---|
| 4,202,574 | A | 5/1980 | Redmayne | |
| 4,620,644 | A * | 11/1986 | Miller | 220/826 |
| D292,037 | S | 9/1987 | Hanifl | |
| 4,771,936 | A * | 9/1988 | Dolby | 229/123.1 |
| 7,147,243 | B2 * | 12/2006 | Kady | 280/655 |
| 8,066,143 | B2 * | 11/2011 | Baltz et al. | 220/324 |
| 8,286,828 | B2 * | 10/2012 | Schafer | 220/826 |
| 8,317,051 | B2 | 11/2012 | Jin et al. | |
| 8,613,369 | B2 * | 12/2013 | Kitto | 220/379 |
| 8,810,361 | B2 * | 8/2014 | Thukral et al. | 340/5.2 |
| 2004/0183313 | A1 * | 9/2004 | Sherman et al. | 292/251.5 |
| 2005/0121015 | A1 * | 6/2005 | Postorivo, Jr. | 124/49 |
| 2008/0169288 | A1 * | 7/2008 | Dawn | 220/315 |
| 2008/0169289 | A1 * | 7/2008 | Dawn | 220/315 |
| 2012/0074823 | A1 * | 3/2012 | Bezich et al. | 312/240 |
| 2013/0087562 | A1 * | 4/2013 | Thukral et al. | 220/210 |

* cited by examiner

*Primary Examiner* — Hau Phan
*Assistant Examiner* — Jacob Meyer
(74) *Attorney, Agent, or Firm* — RG Patent Consulting, LLC; Rachel Gilboy

(57) ABSTRACT

A product line of heavy-duty rolling trash receptacles designed for exterior household and commercial use, and featuring a unique, interlocking, magnetic lid system that will keep the contents secure and safe from animal pests when closed, yet remain open by magnetic attraction when the cans are opened for emptying.

9 Claims, 5 Drawing Sheets

Fully Open

TRASH CAN SYSTEMS

CROSS-REFERENCE TO RELATED APPLICATION

The present application is related to and claims priority from prior provisional application Ser. No. 61/969,358, filed Mar. 24, 2014 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates generally to the field of trash cans and more specifically relates to a trash can with a permanent lid.

2. Description of the Related Art

Most households in the United States have curbside trash pick-up, and many municipalities have regulations requiring that household trash receptacles be equipped with lids. The trouble is that conventional trash cans typically have separate lids, and these present at least two problems. First, the lids tend to get lost, and without a lid, a trash can is open for raccoons, rats, and other animal pests to disturb. Secondly, the agency that picks up the trash must remove the lid to empty the can; and even with cans that feature permanent, hinged lids, the lids do not remain in the open position for emptying. A suitable solution is desirable.

Various attempts have been made to solve the above-mentioned problems such as those found in U.S. Pat. No. 4,202,574 to William L. Redmayne; U.S. Pat. No. 8,317,051 to Jiaming Jin et al; and U.S. Design Pat. No. D292,037 to Paul H. Hanifl. None of the above inventions and patents, taken either singly or in combination, is seen to describe the invention as claimed.

Ideally, a trash can system should provide ease of use and secure containment for refuse and, yet would operate reliably and be manufactured at a modest expense. Thus, a need exists for a reliable trash can system to avoid the above-mentioned problems.

BRIEF SUMMARY OF THE INVENTION

In view of the foregoing disadvantages inherent in the known trash can art, the present invention provides a novel trash can system. The general purpose of the present invention, which will be described subsequently in greater detail is to provide a trash can system.

A trash can system is disclosed herein, in a preferred embodiment, comprising: a trash can assembly including a receptacle body (having an inner volume, an outer surface, and at least one first-body-magnet, at least one second-body-magnet, and a handle, wheels), and an interlocking lid assembly (having a first-lid having a first-lid-magnet, a second-lid having a second-lid-magnet); wherein the trash can system comprises the trash can assembly.

The trash can assembly comprises in functional combination the receptacle body, and the interlocking lid assembly. The wheels are mounted to the receptacle body via appropriate means such that the trash can assembly is readily movable between locations; the handle allowing manipulation during moving of the receptacle body.

The parameters of the receptacle body are defined by the inner volume, and the outer surface; wherein the receptacle body preferably comprises a 3D rectangular profile with an open top with flat walls and a bottom. The at least one first-body-magnet is integral with the outer surface to couple to the first-lid-magnet, as needed; wherein the first-lid comprises a planar profile, and a forked-shape comprising two first-fingers. The at least one second-body-magnet is integral with the outer surface to couple to the second-lid-magnet, as needed; wherein the second-lid comprises a flat profile comprising an E-shape; wherein the E-shape comprise three second-fingers. The two first-fingers are staggered between the three second-fingers when rotated into a folding relationship with one another during closing, the two first-fingers having a lip that the three second-fingers are able to rest upon when the receptacle body is closed via the interlocking lid assembly.

The inner volume of the receptacle body is suitably sized to storingly-fit at least one item of refuse therein; wherein the inner volume is able to be open and closed via the first-lid and the second-lid; wherein the first-lid and the second-lid are able to interlock in a closed-condition. The first-lid is connected to the receptacle body via a first-hinge; the first-lid able to rotate between open and closed positions about a first centerline axis of the first-hinge. The first-lid-magnet is structured and arranged to mate with the at least one first-body-magnet to retain the first-lid in the open position when desired. In a similar manner the second-lid is connected to the receptacle body via a second-hinge; the second-lid able to rotate between the open and closed positions about a second centerline axis of the second-hinge. The second-lid-magnet is structured and arranged to mate with the at least one second-body-magnet to retain the second-lid in the open position when desired. The first-lid and the second-lid are able to swing apart from each other (rotating about respective axis) when opened to allow access to the inner volume of the receptacle body; wherein the trash can assembly is structured and arranged to provide securement from external manipulation (such as animals), when closed, such that the at least one item of refuse is prevented from undesirable removal.

The present invention holds significant improvements and serves as a trash can system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, trash can system constructed and operative according to the teachings of the present invention.

The various embodiments of the present invention will hereinafter be described in conjunction with the appended drawings, wherein like designations denote like elements.

DETAILED DESCRIPTION

Figure 1:
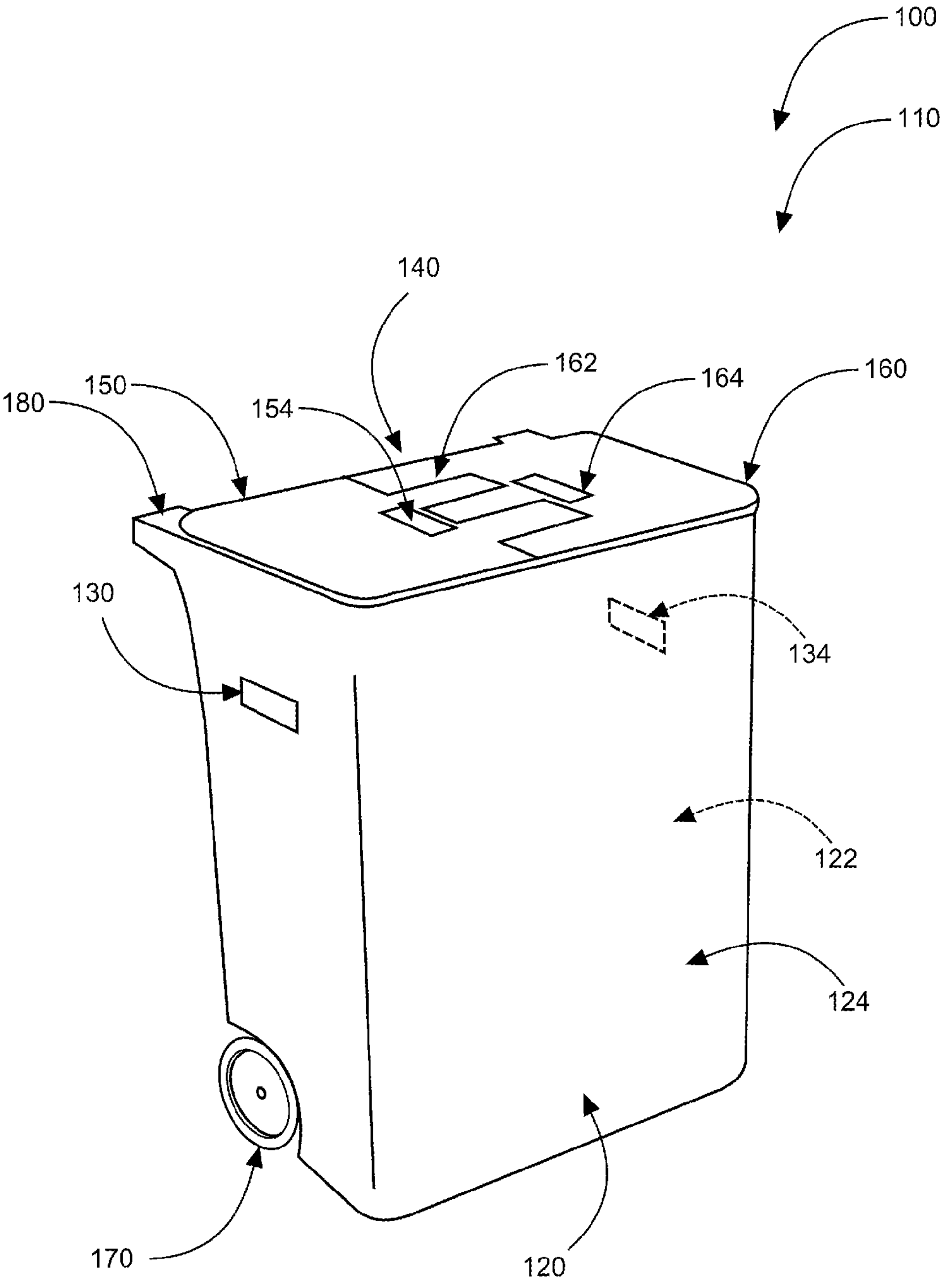
FIG. 1 shows a perspective view illustrating a trash can system in a closed condition according to an embodiment of the present invention.

As discussed above, embodiments of the present invention relate to a trash can and more particularly to a trash can system as used to improve the effective containment of refuse when stored.

Generally speaking, a product line of heavy-duty, rolling trash containers for residential and light-commercial use is embodied herein, offered in various shapes and sizes, and all equipped with a secure, interlocking, permanently fastened lid system that prevents animal pests from accessing the can when the lid is closed, yet permit the lid to remain open in a locked position for easy emptying. The Trash Cans with Permanent Lid may be produced in a square version measuring 2 feet in width and depth by 3 feet in height; and a rectangular version measuring 3 feet in width, 1 foot in depth and 3 feet in height; and other versions, including a version with a round base, and a version without wheels, are envisioned. The material used for construction of the cans may be a lightweight and exceptionally tough and durable laminate, composed of an inner ¼-inch layer of aluminum alloy with an outer ¼-inch layer of a thermoplastic polymer or a synthetic rubber. Two rubber (or plastic) wheels, mounted on a steel axle within a molded recess along the bottom rear of the can, may provide easy rolling, and a molded handle at the top rear of the can may permit hand-truck style pushing or pulling.

The trash cans with permanent lid design that makes this line of trash cans unique lies, as the name suggests, is the lid(s). The lid of the trash cans with permanent lid comprise a two-piece, interlocking unit, hinged on either side and interlocking with alternating, overlapping tabs, similar to the lids of plastic shipping crates. When interlocked, the lid panels provide a secure seal for the cans keeping out rain, sleet, and snow, and preventing the ingress of animal pests ranging from raccoons to roaches. The top of each of the two interlocking lids may be equipped with a permanently mounted magnet as well, and the sides of the can will be equipped with two steel tabs or plates, the position of these on the exterior sides of the can corresponding to the positions of the magnets when the lids are fully opened and swung down on either side. The magnets will thus serve, when the lids are fully opened, to secure the two halves of the lid to either side of the can keeping it fully opened and out of the way during the emptying process. Once the can is emptied, a simple lift of the lid on either side will release the magnet/steel bond, and permit the lid to be returned to the closed position.

For household consumers smaller commercial users, the trash cans with permanent lid may offer a terrific combination of strength, lightweight durability, and security in a rolling, one-piece unit that may last for many years. The unique, interlocking lid design offers a tight seal against precipitation and pest infestation, yet will open easily and stay open when the can is to be emptied. Novel in conception, conceived to meet a real need shared by millions, and built to last, the trash cans with permanent lid may be produced in a variety of sizes, shapes, and styles to meet the range of consumer requirements, and may clearly outperform conventional, plastic trash receptacles.

Figure 2:
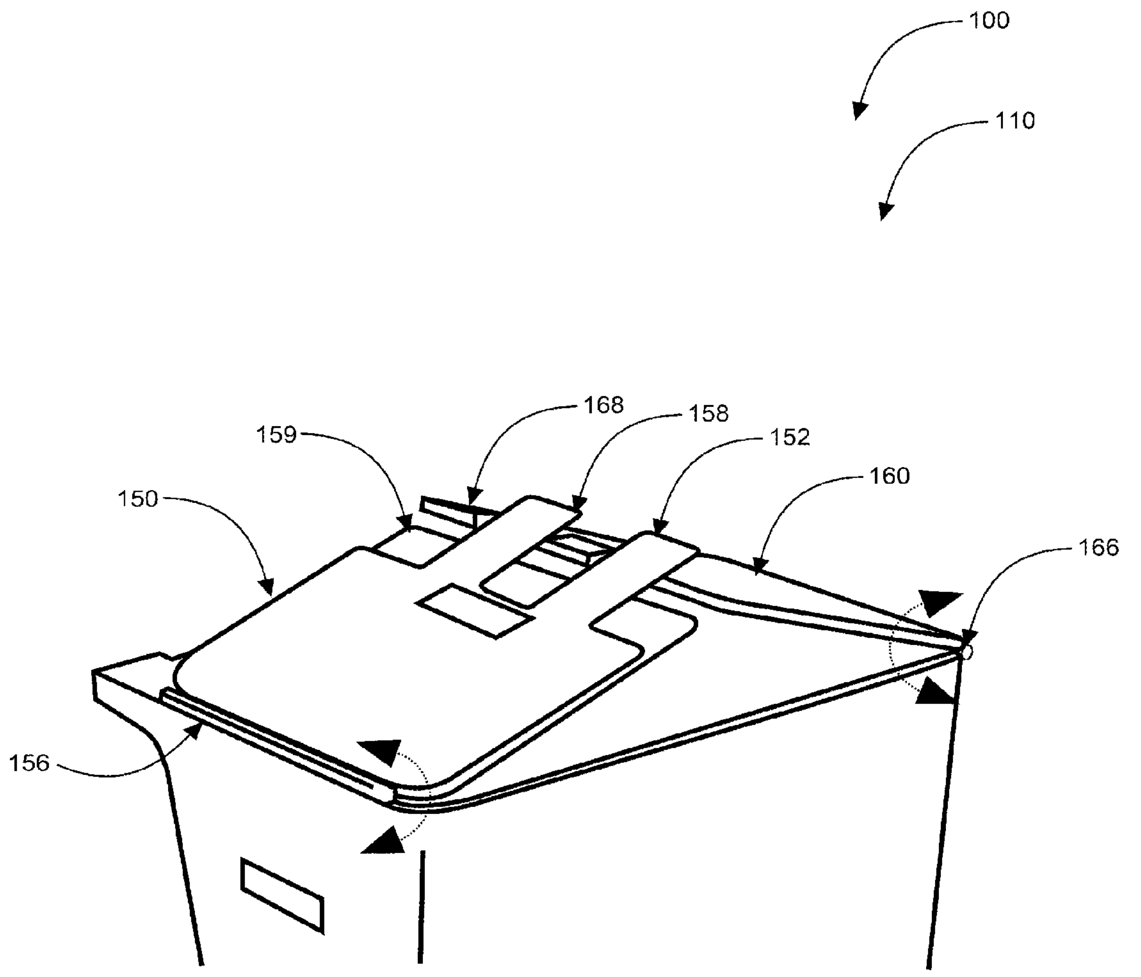
FIG. 2 is a perspective view illustrating a trash can assembly of the trash can system according to an embodiment of the present invention of FIG. 1.
Figure 3:
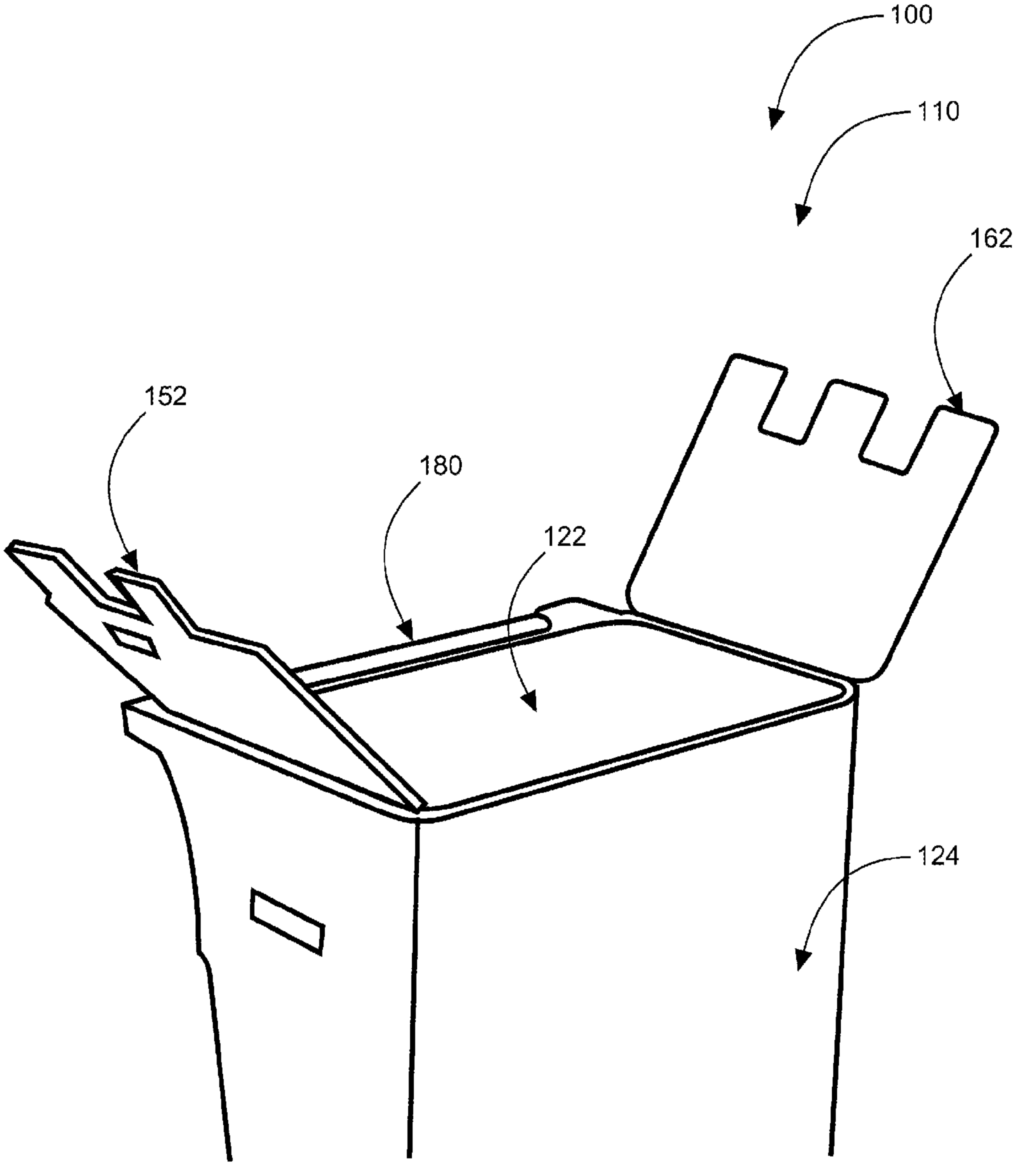
FIG. 3 is another perspective view illustrating the trash can assembly according to an embodiment of the present invention of FIG. 1.
Figure 4:
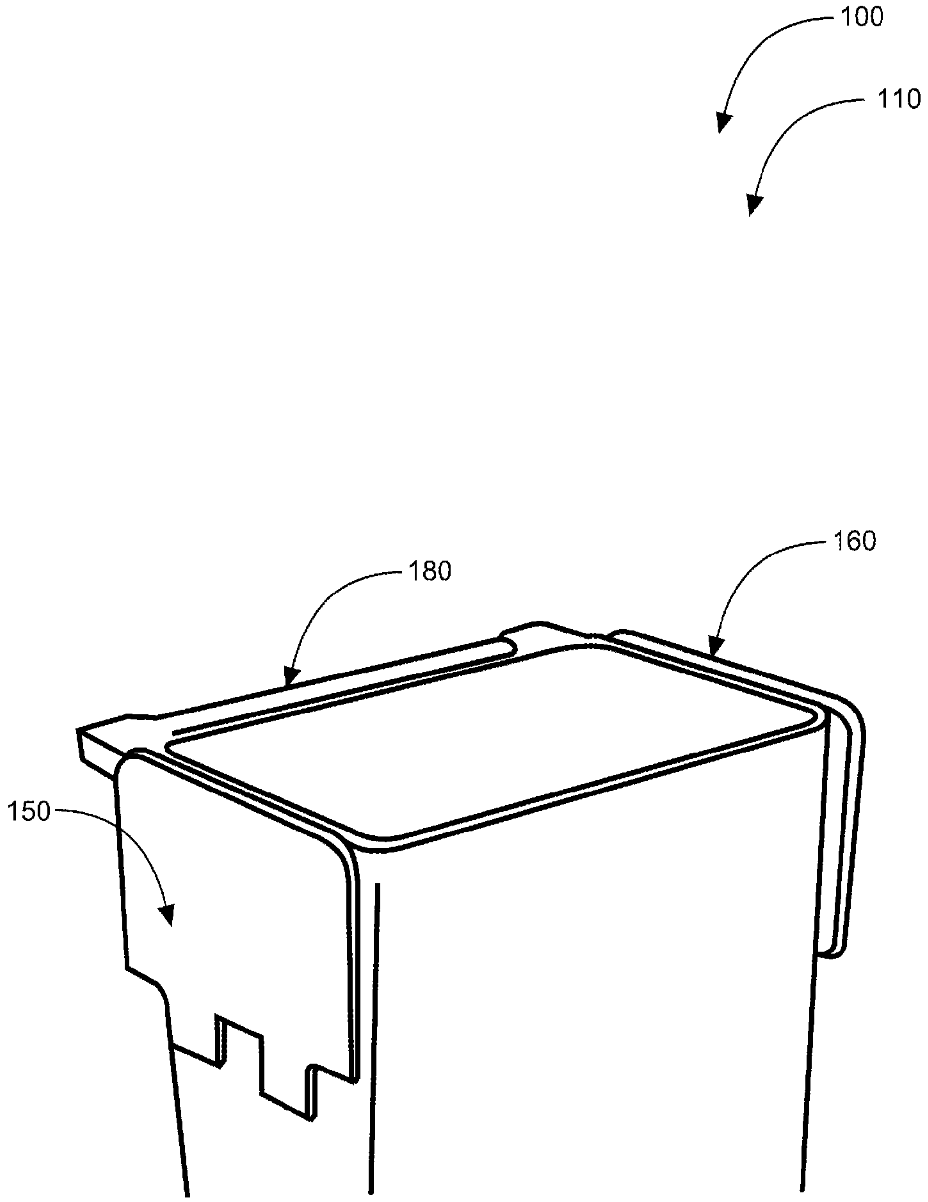
FIG. 4 is another perspective view illustrating the trash can assembly according to an embodiment of the present invention of FIG. 1.
Figure 5:
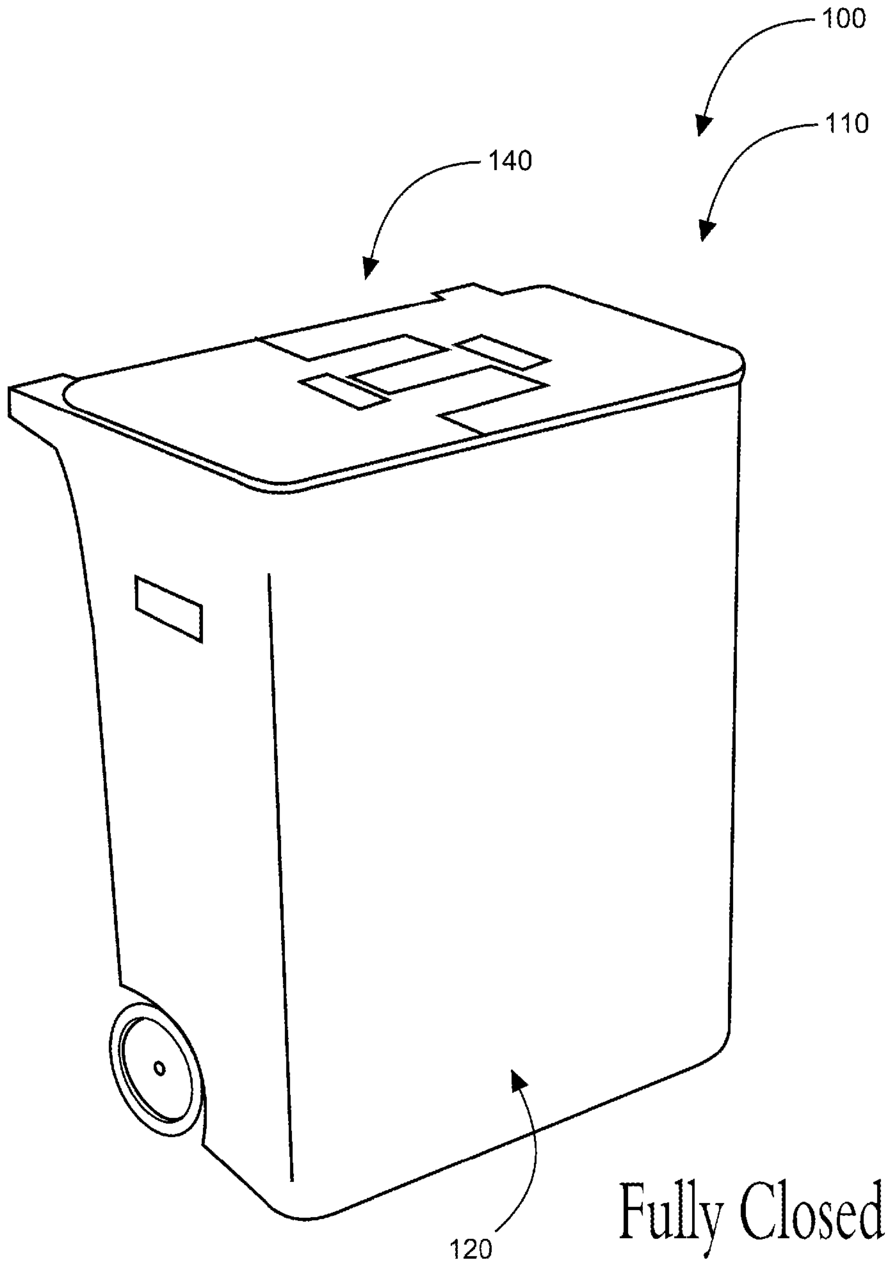
FIG. 5 is yet another perspective view illustrating the trash can assembly according to an embodiment of the present invention of FIG. 1.

Referring now to the drawings by numerals of reference there is shown in FIGS. 1-5, various views of trash can system 100 comprising trash can assembly 110 (shown in open and closed conditions); trash can assembly 110 including receptacle body 120 having inner volume 122, outer surface 124 (shell), and at least one first-body-magnet 130, and at least one second-body-magnet 134, interlocking lid assembly 140 having first-lid 150 having first-lid-magnet 154, second-lid 160 having second-lid-magnet 164. As such, trash can system 100 comprises trash can assembly 110.

Referring now to trash can assembly 110; trash can assembly 110 comprises in functional combination receptacle body 120, and interlocking lid assembly 140. The parameters of receptacle body 120 are defined by inner volume 122, and outer surface 124. The at least one first-body-magnet 130 is integral with outer surface 124 to couple to first-lid-magnet 154, as needed. In a similar manner the at least one second-body-magnet 134 is integral with outer surface 124 to couple to second-lid-magnet 164, as needed for instances such as dumping or the like such that lids 150 and 160 are not 'in the way'.

Inner volume 122 is sized to storingly-fit at least one item of refuse therein; wherein inner volume 122 is able to be open and closed, as shown, via first-lid 150 and second-lid 160; wherein first-lid 150 and second-lid 160 are able to interlock in a closed-condition. First-lid 150 and second-lid 160 are able to swing apart from each other when opened to allow access to inner volume 122 of receptacle body 120. Trash can assembly 110 is structured and arranged to provide securement from external manipulation, by animals and the like, when closed, such that the at least one item of refuse is prevented from undesirable removal.

Referring again now to first-lid 150 and second-lid 160; first-lid 150 preferably comprises a substantially planar profile, as does second-lid 160 comprise a substantially planar profile. First-lid 150 comprises a forked-shape 152. Second-lid 160 comprises an E-shape 162. First-lid 150 is connected to receptacle body 120 via first-hinge 156; first-lid 150 able to rotate between open and closed positions about a centerline axis of first-hinge 156. Referring more specifically now to second-lid 160; second-lid 160 is connected to receptacle body 120 via second-hinge 166; second-lid 160 able to rotate between open and closed positions about a centerline axis of the second-hinge 166.

Uniquely, first-lid-magnet 154 is structured and arranged to mate with the at least one first-body-magnet 130 to retain first-lid 150 in an open position when desired. Second-lid-magnet 164 is structured and arranged to mate with the at least one second-body-magnet 134 to retain second-lid 160 in an open position when desired. First-lid 150 and second-lid 160 are independently manipulatable in relation to receptacle body 120.

Forked-shape 152 of first-lid 150 preferably comprises two first-fingers 158, as shown; E-shape 162 preferably comprises three second-fingers 168, as shown, in preferred embodiments of trash can system 100. In such embodiments two first-fingers 158 are staggered between the three second-fingers 168 when rotated into a folding relationship with one another during closing; the two first-fingers 158 have lip 159 such that the three second-fingers 168 are able to rest upon when receptacle body 120 is closed via interlocking lid assembly 140.

In preferred embodiments receptacle body 120 further comprises wheels 170, as shown, such that trash can assembly 110 is readily movable between locations. Receptacle body 120 may further comprise handle 180. In preferred embodiments receptacle body 120 comprises a 3D rectangular profile with an open top; wherein receptacle body 120 comprises flat walls and a bottom. Other shapes and profiles may be used.

A method of use may comprise use of the present invention as indicated between the FIGS. 1-5 including opening, closing, and inter-locking. The magnets may be used to facilitate securement in open and closed conditions for preventing animals from ingressing to gain access to refuse (when lids are closed) and for unobstructed dumping of refuse (when lids are open). It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An improved trash can system for use in conjunction with a trash removal truck, said improved trash can system comprising:

a trash can assembly including;
a receptacle body having;
an inner volume;
an outer surface;
an upper rim extending around said receptacle body;
at least one first-body-magnet; and
at least one second-body-magnet;
an interlocking lid assembly having;
a first-lid having;
a first-lid-magnet;
a second-lid having;
a second-lid-magnet; and
wherein parameters of said receptacle body are defined by said inner volume, and said outer surface;
wherein said at least one first-body-magnet is integral with said outer surface to couple to said first-lid-magnet;
wherein said at least one second-body-magnet is integral with said outer surface to couple to said second-lid-magnet;
wherein said inner volume is sized to fit at least one item of refuse therein;
wherein said inner volume is able to be open and closed via said first-lid and said second-lid;
wherein said first-lid and said second-lid are able to interlock in a closed-condition;
wherein said first-lid and said second-lid are able to swing apart from each other when opened to allow access to said inner volume of said receptacle body;
wherein said trash can assembly is structured and arranged to provide securement from external manipulation when closed, such that said at least one item of refuse is prevented from undesirable removal;
wherein said first-lid comprises a forked-shaped flat top portion comprising two spaced first-fingers, and a flat bottom portion that extends the entire width of said first-lid, is adapted to rest upon front and back portions of said upper rim, and extends under and along a length of said two first-fingers to thereby provide a rigid flat surface below, alongside, and between each of said two first-fingers and creates a lip for second-fingers to be placed and securely rest thereupon;
wherein said second-lid comprises an E-shape comprising three spaced second-fingers;
wherein said two first-fingers are staggered between said three second-fingers when rotated into a folding relationship with one another during closing, and wherein said three second-fingers are able to securely rest upon said lip when said receptacle body is closed via said interlocking lid assembly; and
wherein when said trash can assembly is to be emptied by said trash removal truck, said first-lid and said second-lid are swung into an open position, releasably connected to respective sides of said trash can assembly via respective said magnets, and held open during the emptying process by said trash removal truck.

2. The trash can system of claim 1 wherein said first-lid comprises a planar profile.

3. The trash can system of claim 1 wherein said second-lid comprises a planar profile.

4. The trash can system of claim 1 wherein said first-lid is connected to said receptacle body via a first-hinge, said first-lid able to rotate between open and closed positions about a centerline axis of said first-hinge.

5. The trash can system of claim 1 wherein said second-lid is connected to said receptacle body via a second-hinge, said second-lid able to rotate between open and closed positions about a centerline axis of said second-hinge.

6. The trash can system of claim 4 wherein said first-lid-magnet is structured and arranged to mate with said at least one first-body-magnet to retain said first-lid in said open position when desired.

7. The trash can system of claim 5 wherein said second-lid-magnet is structured and arranged to mate with said at least one second-body-magnet to retain said second-lid in said open position when desired.

8. The trash can system of claim 1 wherein said receptacle body further comprises wheels such that said trash can assembly is readily movable between locations.

9. The trash can system of claim 1 wherein said receptacle body further comprises a handle.

* * * * *